United States Patent [19]

Hebbale et al.

[11] Patent Number: 5,282,401
[45] Date of Patent: Feb. 1, 1994

[54] ADAPTIVE ELECTRONIC CONTROL OF POWER-ON UPSHIFTING IN AN AUTOMATIC TRANSMISSION

[75] Inventors: Kumaraswamy V. Hebbale; Chi-Kuan Kao, both of Troy; Dean E. McCulloch, Washington, all of Mich.

[73] Assignee: General Motors Corporation, Detroit, Mich.

[21] Appl. No.: 832,834

[22] Filed: Feb. 7, 1992

[51] Int. Cl.⁵ .................................................. B60K 41/02
[52] U.S. Cl. .................................................. 74/866
[58] Field of Search ............ 74/866, 730.1, 731.1, 74/732.1, 733.1; 192/109 F, 85 R, 87.1, 87.11, 87.12, 87.13, 3.58

[56] References Cited

U.S. PATENT DOCUMENTS

| | | | |
|---|---|---|---|
| 4,875,391 | 10/1989 | Leising et al. | 74/866 |
| 5,046,174 | 9/1991 | Lentz et al. | 74/866 X |
| 5,070,747 | 12/1991 | Lentz et al. | 74/866 |
| 5,072,390 | 12/1991 | Lentz et al. | 364/424.1 |
| 5,086,670 | 2/1992 | Nitz et al. | 74/866 |
| 5,089,963 | 2/1992 | Takahashi | 74/866 X |
| 5,151,858 | 9/1992 | Milunas et al. | 74/866 X |
| 5,211,079 | 5/1993 | Runde et al. | 74/866 |

*Primary Examiner*—Rodney H. Bonck
*Assistant Examiner*—Khoi Ta
*Attorney, Agent, or Firm*—Mark A. Navarre

[57] ABSTRACT

An upshift control in which open-loop control parameters are adaptively adjusted to improve the shift quality in a subsequent upshift to the same ratio. A multi-variable adaptive control methodology attributes detected torque phase timing deviations to variability in the on-coming fill time and/or return spring pressure, and suitably corrects the parameter(s) so that in the next shift of the same type, the detected deviation will be reduced or eliminated. The torque phase timing deviations are detected by measuring specified intervals in relation to the achievement of predetermined input and output acceleration conditions, and comparing the measured intervals with reference intervals. The gradients of the deviations in relation to the respective control parameter are determined and stored in a look-up table, and subsequently used to determine adaptive correction values.

8 Claims, 12 Drawing Sheets

| e1, e2 | $\dfrac{d(e1)}{d(Tfill)}$ | $\dfrac{d(e2)}{d(Tfill)}$ | $\dfrac{d(e1)}{d(Poncrs)}$ | $\dfrac{d(e2)}{d(Poncrs)}$ |
|---|---|---|---|---|
| -80 msec | -0.3 | -0.8 | -1.6 | -0.6 |
| -50 msec | -0.3 | -0.8 | -1.6 | -0.6 |
| -20 msec | -0.3 | -0.8 | -1.6 | -0.6 |
| 10 msec | -1.0 | -1.8 | -1.6 | -1.0 |
| 40 msec | -1.0 | -1.8 | -1.6 | -1.0 |
| 70 msec | -1.0 | -1.8 | -1.6 | -1.0 |

ADAPTIVE ELECTRONIC CONTROL OF POWER-ON UPSHIFTING IN AN AUTOMATIC TRANSMISSION

This invention relates to the control of power-on transmission upshifting involving on-coming and off-going torque transmitting elements, and more particularly, to a multi-variable adaptive adjustment of the control of the on-coming element.

BACKGROUND OF THE INVENTION

Upshifting from a lower speed ratio to an upper speed ratio in an automatic transmission involves releasing a fluid operated torque transmitting element associated with the lower speed ratio while engaging a fluid operated torque transmitting element associated with the upper speed ratio. The torque transmitting elements are referred to herein as clutches The element to be released is referred to as an off-going clutch, and the element to be engaged is referred to as an on-coming clutch.

The engagement of the on-coming clutch is controlled via regulation of the fluid pressure supplied thereto, referred to herein as the on-coming pressure. The commanded pressure includes a clutch dependent component and a torque dependent component. The clutch dependent component is an empirically derived pressure required to overcome a preloaded clutch return spring which biases the clutch toward disengagement and is referred to herein as the return spring pressure. The torque dependent component is scheduled based on an estimation of the input torque, the mechanical gain of the clutch and the speed ratio with which the clutch is associated.

Similarly, the release or disengagement of the off-going clutch may be electronically controlled via regulation of the off-going pressure, as in the illustrated embodiment. Alternatively, the release of the off-going clutch may be controlled mechanically with an over-running or one-way clutch mechanism.

An upshift is fundamentally separable into fill, torque and inertia phases. In the fill phase, the on-coming clutch is filled with fluid in preparation for engagement. In the torque phase, the on-coming pressure is progressively increased to increase the on-coming clutch torque capacity while the off-going pressure is progressively released to reduce the off-going clutch torque capacity. The initiation of the inertia phase is marked by a consequent slippage of the off-going clutch (and corresponding reduction of the transmission input speed), the shift being complete when the on-coming clutch is fully engaged.

Accurate control of the on-coming torque capacity during the torque phase requires accurate knowledge of the on-coming fill time and the return spring pressure. Both the fill time and the return spring pressure are empirically determined and subject to variations associated with age and manufacture. In turn, successful closed-loop control of the on-coming clutch in the inertia phase depends on whether the on-coming torque capacity at the initiation of the inertia phase is sufficient to carry the input torque. Accurate knowledge of the fill time and on-coming return spring pressure are therefore essential to the achievement of consistent high quality shifting.

Analysis of the on-coming clutch fill time and return spring pressure reveals that variation of either parameter produces variation in the torque phase of the shift. Consequently, a detected deviation from a desired condition during the torque phase may be due to variability in one or both of the empirically derived on-coming clutch control parameters.

SUMMARY OF THE PRESENT INVENTION

The present invention is directed to an improved upshift control in which control parameters corresponding to the on-coming clutch fill time and return spring pressure are adaptively adjusted to improve the shift quality in a subsequent upshift to the same ratio. The control of this invention addresses the above described torque phase variability with a multi-variable adaptive control methodology which properly attributes a detected torque phase deviation to variability in the on-coming fill time and/or return spring pressure, and suitably corrects the parameter(s) so that in the next shift of the same type, the detected deviation will be reduced or eliminated.

The torque phase deviation is detected by measuring specified time intervals in relation to the achievement of predetermined milestones in the progression of the drive axle acceleration from an initial value to a target value, and comparing the measured intervals with reference intervals. In the illustrated embodiment, the drive axle acceleration conditions are also used to control the release of the off-going clutch, as taught in U.S. Pat. No. 5,046,383 to Butts et al., issued on Sep. 10, 1991, and assigned to the assignee of the present invention.

The relationship between detected deviations and control parameter variation is empirically determined for both fill time and return spring on-coming pressure, in each type of upshift. The gradients of the errors in relation to the respective control parameter are determined and stored in a look-up table. In operation, the detected timing errors are each applied to the respective stored gradient values and a gain term to determine adaptive corrections to be applied to both empirically derived parameters for the next such upshift. The adaptive adjustment is suspended when the detected timing deviation is smaller than a predetermined amount, and a hunting elimination routine is employed to limit the effect of inconsistent error determinations.

DETAILED DESCRIPTION OF THE DRAWINGS

Figure 1A:
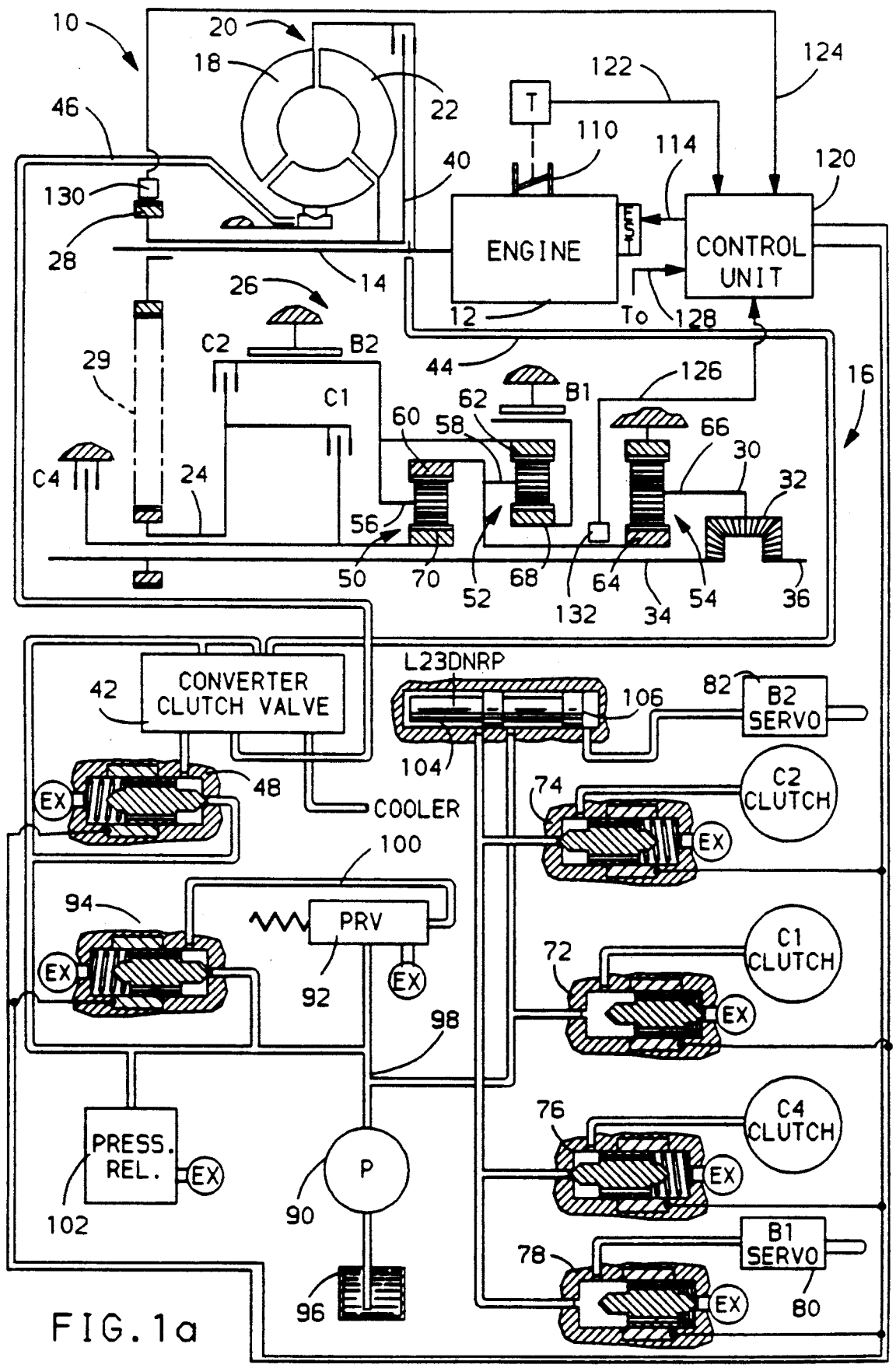
FIG. 1a is a system diagram of an electronically controlled transmission, including a computer based control unit.

Referring particularly to FIG. 1a, the reference numeral 10 generally designates a motor vehicle powertrain comprising an engine 12 connected to rotatably drive the input shaft 14 of an automatic transmission 16. The transmission input shaft 14 is connected to drive the impeller (input) 18 of a fluidic torque converter 20, and the turbine (output) 22 of torque converter 20 is connected to rotatably drive the input shaft 24 of a multi-ratio gearset 26 via the sprocket 28 and chain 29. The output shaft 30 of gearset 26, in turn, is connected to a differential gearset 32, the output shafts 34, 36 of which are connected to drive a pair of vehicle wheels (not shown).

The torque converter 20 also includes a clutch mechanism 40 engageable to mechanically couple the impeller 18 and turbine 22 during specified vehicle operating conditions. When open converter operation is desired, a converter clutch valve 42 supplies converter feed pressure on the release side of the clutch 40 via line 44. The return fluid is vented to a fluid cooler (not shown) via line 46. When closed converter or lock-up operation is desired, the valve 42 directs fluid pressure from the linear actuator 48 to the apply side of the clutch 40 via line 46, while exhausting the area between the clutch 40 and the housing of converter 20 via line 44.

The gearset 26 includes three planetary gearsets, as generally designated by the reference numerals 50, 52 and 54. The planet carriers 56/58 and ring gears 60/62 of gearsets 50/52 are cross-coupled, as shown. The carrier and ring gear combination 58/60 provides an input to the sun 64 of gearset 54, the carrier 66 being connected to drive the output shaft 30. The carrier and ring gear combination 56/62 can be connected to the input shaft 24 via clutch C2 or grounded to the case of transmission 16 via the brake B2. The sun 68 of gearset 52 can be grounded to the case via brake B1; the sun 70 of gearset 50 can be grounded to the case of transmission 16 via clutch C4, or connected to the input shaft 24 via clutch C1.

Figures 1B, 8:
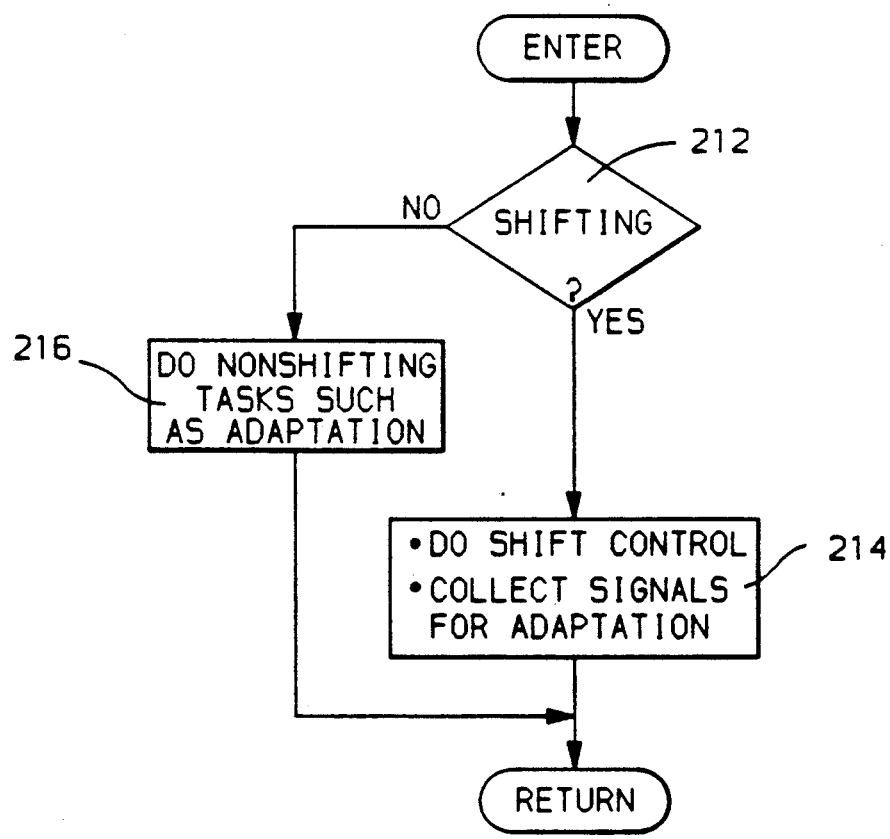
FIG. 1b is a table indicating the clutch engagement patterns required to establish the various speed ratios of the transmission depicted in FIG. 1.
FIGS. 7-14 depict flow diagrams representative of computer program instructions executed by the computer-based control unit of FIG. 1 in carrying out the control of this invention.

The clutches C1, C2, C4, B1 and B2 are selectively engageable according to the friction element state table of FIG. 1b to provide four forward ratios (1st, 2nd, 3rd and 4th) and one reverse ratio. As indicated in the lower right-hand portion portion of FIG. 1a, the supply of fluid pressure to the clutches C1, C2 and C4 is controlled by the linear actuator valves (LAVs) 72, 74 and 76, respectively; the brake B1 is controlled by LAV 78 and fluid operated servo 80; and the brake B2 is controlled by the manual valve 104 and fluid operated servo 82.

With four forward ranges, three upshifts are possible: 1-2, 2-3 and 3-4. The 1-2 upshift requires concurrent release of the C1 clutch and engagement of the C2 clutch. The 2-3 upshift requires concurrent release of the B1 brake and engagement of the C1 clutch. The 3-4 upshift requires concurrent release of the C1 clutch and engagement of the C4 clutch.

The operating fluid for torque converter 20, servos 80-82 and LAVs 48 and 72-78 is generated by a fluid supply circuit comprising a pump 90, a pressure regulator valve (PRV) 92 and the LAV 94. The pump draws fluid from the reservoir 96, providing pressurized fluid, referred to herein as line pressure, in line 98. The PRV 92 operates in response to a spring bias and a hydraulic bias to regulate the pressure in line 98 by returning a variable portion of the pump output to the reservoir 96. The hydraulic bias is developed by LAV 94, which supplies a controlled pressure to an end land of PRV 92 via line 100. A pressure relief valve 102 limits the line pressure at a predetermined value.

The line pressure developed by the pump 90 is supplied directly to the converter clutch valve 42, the LAVs 48 and 72, and the manual valve 104. The manual valve 104 directs line pressure to LAVs 74-78 and the servo 82 depending on the displacement of its valve spool 106. The spool 106 is mechanically coupled to an operator manipulated range selector (not shown), and is movable to one of seven detent positions corresponding to the transmission ranges. The detent positions, designated L, 2, 3, D, N, R and P, correspond to the 1st, 2nd, 3rd, 4th, Neutral, Reverse and Park ranges, respectively. Line pressure is supplied to the brake servo 82 when the spool 106 is positioned at the R detent. Line pressure is supplied to LAVs 74-78 when the spool 106 is positioned at the 1, 2, 3 or D detents.

The LAVs 48, 94 and 72-78 are single stage solenoid operated pressure regulating devices, each having an armature positioned as a function of the average current supplied to the respective solenoid coil. Due to the linear nature of the valve, substantially no pulsations occur in the supplied pressure signals.

The engine 12 includes a throttle 110 adapted to be positioned by the vehicle operator for controlling the engine power output and an electronic spark timing (EST) module for setting the spark timing in accordance with an advance/retard signal on line 114.

The control of the engine EST module and the LAVs 48, 72-78 and 94 is performed by a computer based control unit 120. In carrying out such control, the control unit 120 responds to various inputs, including a throttle position signal on line 122, a turbine speed signal on line 124, and an output speed signal on line 126. An indication of the engine torque output To may be supplied to the control unit on line 128.

The various input signals are obtained using conventional transducer technology. The throttle transducer T may be a potentiometer, and the speed transducers 130 and 132 may be conventional magnetic speed pick-ups. In the case of the turbine speed transducer 130, the pick-up may be positioned to cooperate with the teeth of chain sprocket 28; in the case of the output speed transducer 132, the pick-up may be positioned to cooperate with teeth formed on an output-related shaft as shown.

The control unit 120 contains conventional computer elements, including a microcomputer, memory elements for storing operating instructions and data, A/D converter elements for conditioning various analog inputs, and input/output elements for receiving and generating the various input and output signals. Flow diagrams representative of computer programs executed by the microcomputer in carrying out the control functions of this invention are described below in reference to the FIGS. 7-14.

Figure 2:
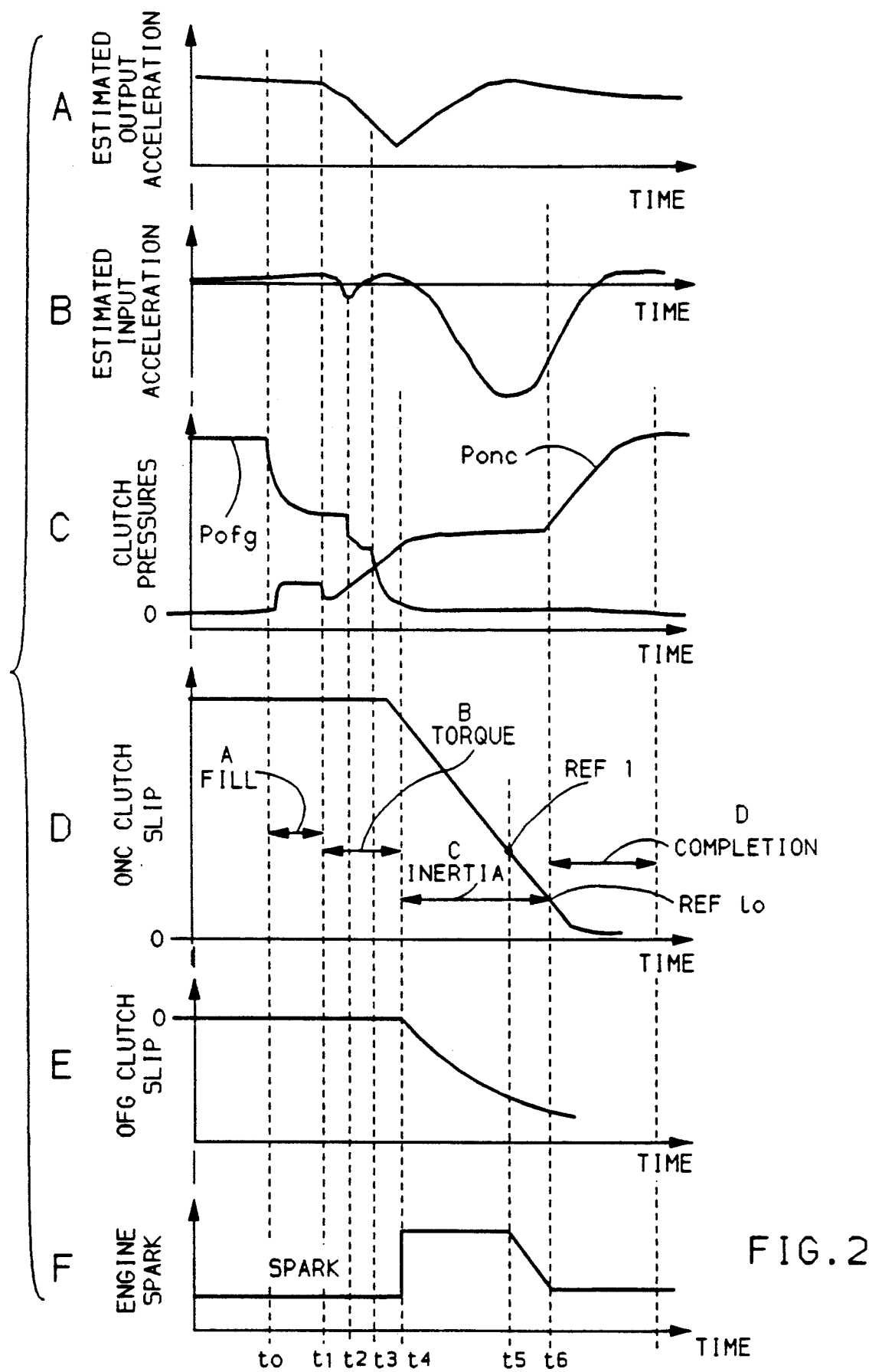
FIGS. 2 and 3 graphically depict a power-on upshift carried out according to this invention.

FIG. 2 illustrates a power-on upshift according to this invention in which both on-coming and off-going clutches are electronically controlled. On a common time base, Graphs A-F depict the estimated acceleration of output shaft 30 (Graph A) and input shaft 14 (Graph B), the on-coming and off-going clutch pressures (Graph C), the on-coming clutch slip (Graph D), the off-going clutch slip (Graph E) and the engine spark timing retard signal (Graph F).

Through conventional shift pattern generation techniques, the control unit 120 determines that a power-on upshift is required, and the shift is initiated at time t0 with the start of the on-coming clutch fill phase. The fill time and fill pressure are predetermined as a combined function of the torque vs. pressure characteristic (gain) of the on-coming clutch, exhaust time, transmission oil temperature, and the rotating speed of the on-coming clutch. The fill time is subject to variation with numerous factors, and is adaptively corrected according to this invention based on a measured deviation of the torque phase progression from an ideal progression, as explained in detail below.

Figure 3:
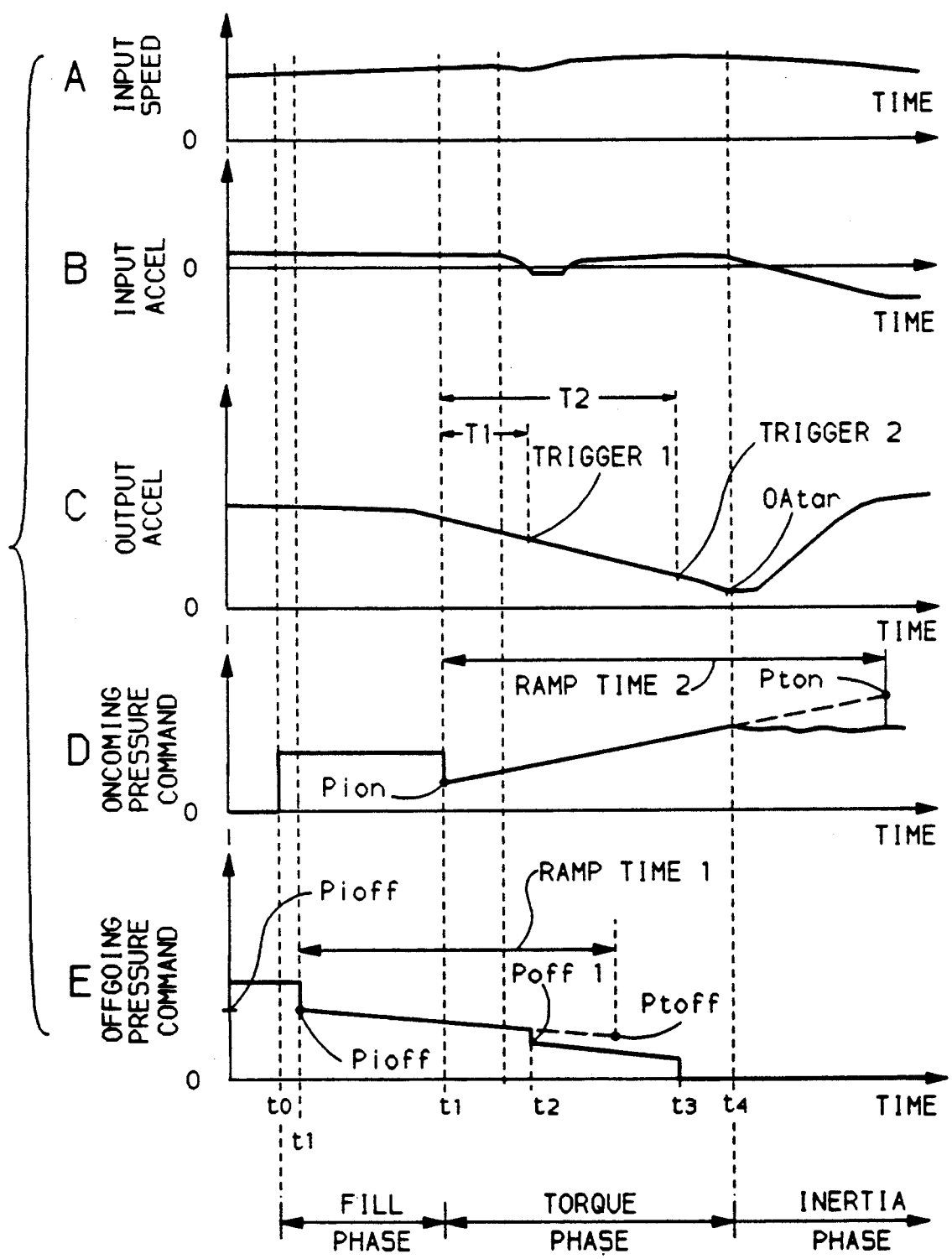

A predetermined time after the start of the fill period, the off-going clutch pressure command is reduced to an initial value, designated Pioff in FIG. 3. This initial reduction is simply intended to initiate a progressive ramp-down of the clutch pressure for reducing the off-going clutch torque capacity without producing off-going clutch slippage. If off-going clutch slippage does occur during the ramp-down, a back-up closed-loop control is initiated to hold the slip to a near-zero level. Pioff is an open-loop term, determined according to the expression:

$$Pioff = Pofgrs + f1(Tin, Cofg, Rold)$$

where Pofgrs is the pressure required to overcome the off-going clutch return spring and its preload, Tin is the estimated gearset input torque, Cofg is the torque vs. pressure characteristic, or gain, of the off-going clutch, and Rold is the speed ratio associated with the off-going clutch.

At the same time, the control unit 120 computes a target pressure Ptoff at which the off-going clutch would have just enough capacity to prevent slippage, based again on Pofgrs, Tin, Cofg and Rold. A suitable ramp period, RAMP TIME 1 in Graph E of FIG. 3, is selected as a function of the shift type (that is, 1-2, 2-3 or 3-4) and the particular clutch. The ensuing pressure ramp-down is carried out at a rate (slope) calculated to reach the target pressure Ptoff at the end of the ramp period. As illustrated in FIG. 3, the ramp-down period typically extends beyond the end of the fill phase, allowing for a certain amount of clutch overlap.

Also during the fill phase, the estimated acceleration of the gearset output shaft 30 is averaged and stored in the memory of control unit 120. The stored value thus also represents the average output acceleration at the initiation of the torque phase, and is designated herein as OAitp. Based on the stored value of OAitp, the speed ratio of the old range SR(old) and the speed ratio of the new range SR(new), the control unit 120 determines a target output acceleration value OAtar for the end of the torque phase. Algebraically, the target output acceleration OAtar is given by the expression:

$$OAtar = OAitp \cdot SR(new)/SR(old)$$

Upon completion of the fill phase at time t1, the on-coming pressure command is reduced to an initial pressure Pion which is higher than the on-coming clutch return spring pressure Poncrs. Similar to the initial off-going pressure Pioff, the initial on-coming pressure Pion is determined according to the expression:

$$Pion = Poncrs + f2(Tin, Conc, Rdes)$$

where Conc is the gain of the on-coming clutch and Rdes is the speed ratio associated with the on-coming clutch.

Then, the on-coming pressure command Ponc is ramped up to a target pressure Pton. The target pressure Pton is the pressure at which the on-coming clutch should be able to carry all of the input torque Tin, and is given by the expression:

$$Pton = Poncrs + f3(Tin, Conc, Rdes)$$

As with the off-going clutch, a suitable ramp period RAMP TIME 2 is selected as a function of the desired shift feel, the shift type and the involved clutch. The ensuing pressure ramp is carried out at a rate (slope) calculated to reach the target pressure Pton at the end of the ramp period.

Graph C of FIG. 3 defines a pair of acceleration-based triggers employed to sequence the various torque phase control steps. The first torque phase trigger TRIGGER1 occurs when (1) the estimated input acceleration IAest is observed to be negative for at least a predetermined interval, or (2) the estimated output acceleration OAest drops by a specified percentage P1 of the difference between the initial and target acceleration values OAitp, OAtar, whichever condition occurs first. In the example of FIGS. 2-3, conditions (1) and (2) occur concurrently at time t2.

In the illustrated embodiment, the off-going clutch pressure command is stepped down to an intermediate value Poff1 when the first trigger point is detected, and then ramped down even further at a predetermined rate. The intermediate value Poff1 may be a specified percentage P2 of the target value Ptoff, and the previous ramp rate may be maintained.

The second trigger point TRIGGER2 occurs as the estimated output acceleration approaches the target value OAtar. The target value OAtar is the ideal acceleration value at the end of the torque phase based on the intended change in speed ratios. Specifically, the second trigger point is defined as the moment when the estimated output acceleration OAest drops by a second specified percentage P3 of the difference between the initial and target acceleration values OAitp, OAtar. In the example of FIG. 3, this condition occurs at time t3. Alternatively, the second trigger point may be defined by the start of the inertia phase, as manifested by the initiation of off-going clutch slippage at time t4.

In the illustrated embodiment, the off-going clutch pressure command is reduced to zero when the second trigger point is detected, as seen in Graph E. When negative slippage of the off-going clutch is observed at time t4, a closed-loop control of the on-coming clutch is initiated to promptly complete the torque phase and commence the inertia phase. The closed-loop feedback term is the on-coming clutch slippage, the desired slip value being determined from a smooth time-based profile similar to that shown in FIG. 2. When the on-coming clutch slippage is less than a reference amount, the on-coming pressure command is ramped up to line pressure in open-loop fashion, completing the shift.

The engine control comprises a controlled retard of the spark timing during the inertia phase of the shift. When the closed-loop on-coming pressure control is initiated at time t4, the engine spark is retarded in an amount to reduce the engine output torque by approximately 40%. The retard is ramped out at an open-loop rate beginning at time t5 when on-coming clutch slippage of less than a predetermined amount is observed, thereby ensuring a smooth torque transient upon completion of the shift.

Under normal operating conditions, the above-described control works effectively and achieves consistent high quality shifting. The only portion of the control subject to variability is that of the on-coming clutch during the fill and torque phases, since this control is essentially open-loop. When on-coming variability does occur, the on-coming torque capacity at the initiation of the inertia phase may be higher or lower than that required to carry the input torque. This requires relatively large closed-loop pressure correction, thereby degrading the shift quality.

Accordingly, the control of this invention is directed to an adaptive correction of the on-coming clutch control parameters which may be subject to variability: the fill time Tfill and the return spring pressure Poncrs used to compute the initial and target on-coming pressures. In carrying out the control, both Tfill and Poncrs comprise two components: a nominal component which is the base calibration value used under normal conditions when there are no errors, and an adaptive component which is a correction to the nominal component.

A parametric analysis of shifting dynamics has shown that the timing of the above-described torque phase triggers (TRIGGER1 and TRIGGER2) is influenced by variation in both the on-coming clutch fill time Tfill and the on-coming clutch return spring pressure Poncrs, and that consistent timing of the triggers is essential to the achievement of consistent high quality shifting. The actual timing of the acceleration based triggers TRIGGER1 and TRIGGER2 is defined in relation to the end of the on-coming clutch fill phase.

As shown in Graph C of FIG. 3, the timing of TRIGGER1, designated T1, is defined as the interval between the calculated end of fill at time t1 and the occurrence of the specified acceleration-based event at time t2. Similarly, the actual timing of TRIGGER2, designated T2, is defined as the interval between the calculated end of fill at time t1 and the occurrence of the specified acceleration-based event at time t3. In each case, the actual (measured) timing values T1, T2 are compared with respective ideal values T1des, T2des to form first and second error signals e1, e2. That is:

$$e1 = T1 - T1des, \text{ and}$$

$$e2 = T2 - T2des$$

The ideal values T1des and T2des are predetermined as a function of input torque Tin and the speed ratio change occasioned by the shift.

Figure 4:
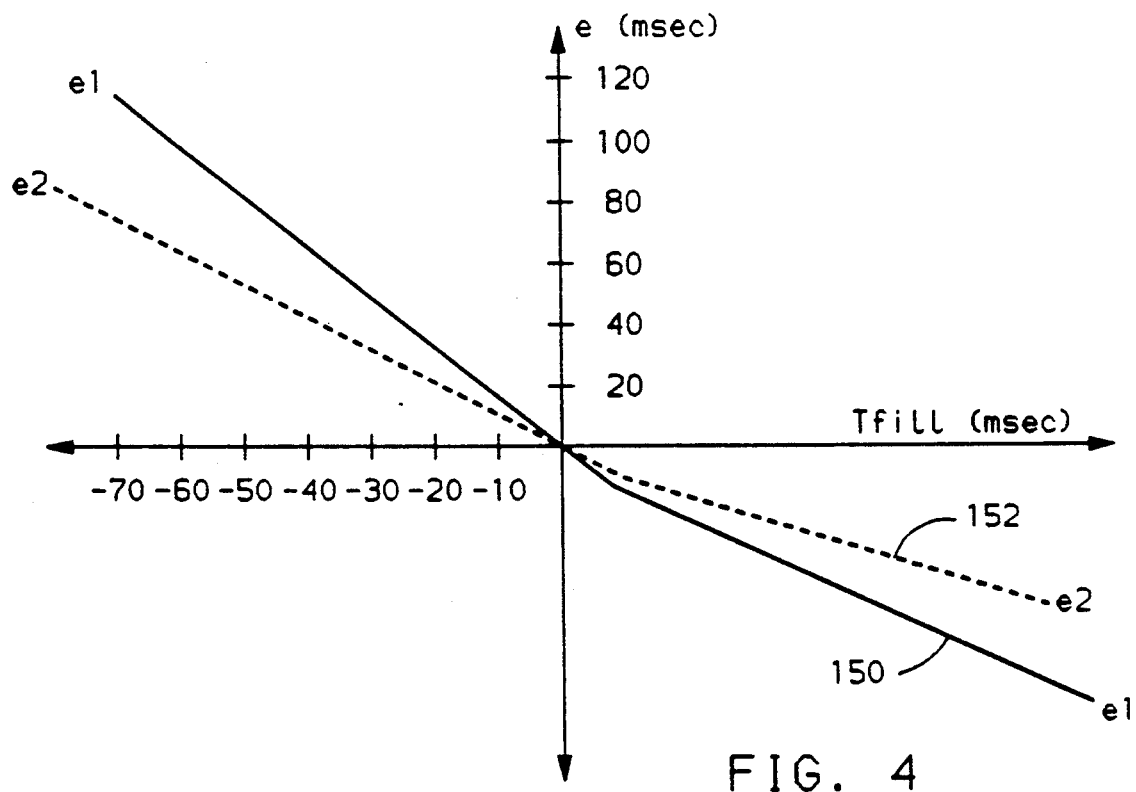
FIG. 4 graphically depicts an empirically determined relationship between the specified torque phase timing intervals and on-coming clutch fill time (Tfill).

The traces 150 and 152 of FIG. 4 graphically depict variation in the errors e1 and e2, respectively, as a function of fill time Tfill, where the origin represents the nominal component or base calibration of the fill time Tfill. The traces 154 and 156 of FIG. 5 similarly depict variation in the errors e1 and e2, respectively, as a function of the on-coming clutch return spring pressure Poncrs, the origin representing the base calibration pressure.

While fill time and return spring pressure variability produce torque phase timing errors of the same sign, the changes in errors e1 and e2 per unit change in fill time and return spring pressure are distinct. Specifically, error e1 is affected more by changes in fill time Tfill than is error e2, and error e2 is affected more by changes in on-coming return spring pressure Poncrs than is error e1. This is reflected in the different slopes of the traces in FIGS. 4 and 5. This means that the measured errors e1, e2 may be apportioned among the adaptive parameters (fill time and return spring pressure) through the use of a multi-variable gradient methodology.

Figure 5:
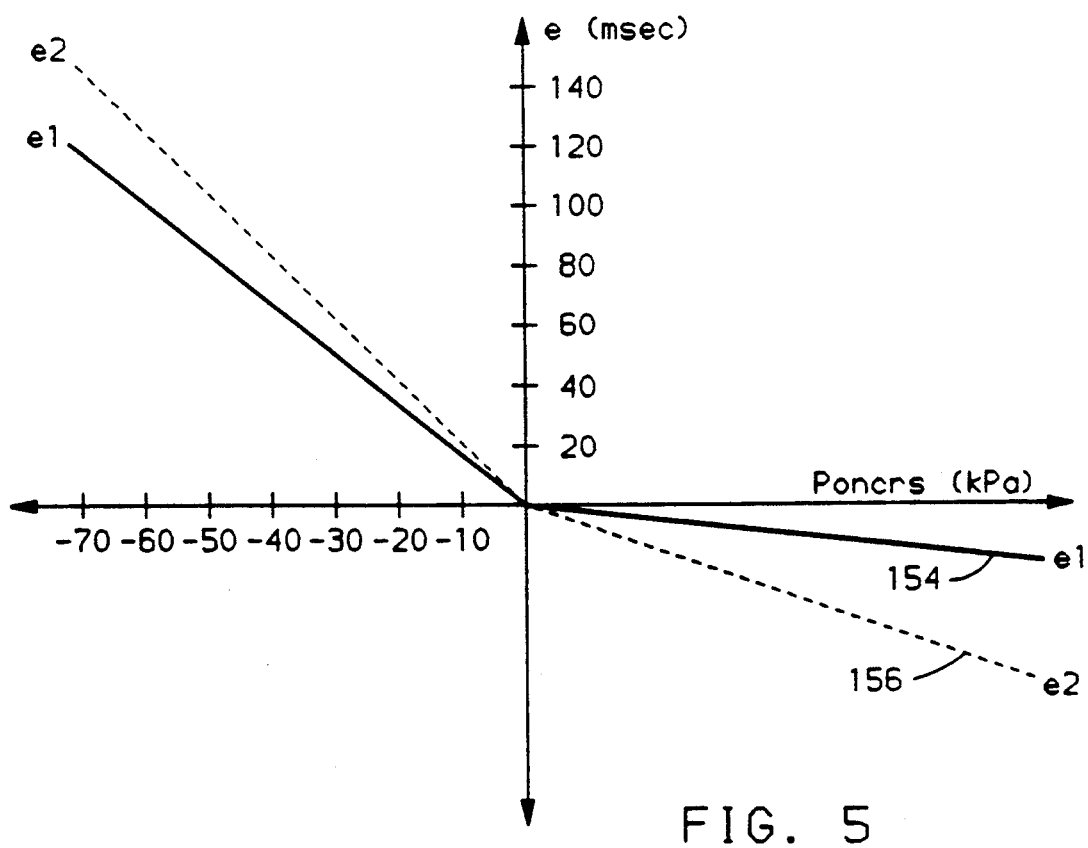
FIG. 5 graphically depicts an empirically determined relationship between the specified torque phase timing intervals and base on-coming clutch return spring pressure (Poncrs).
Figures 6, 7:
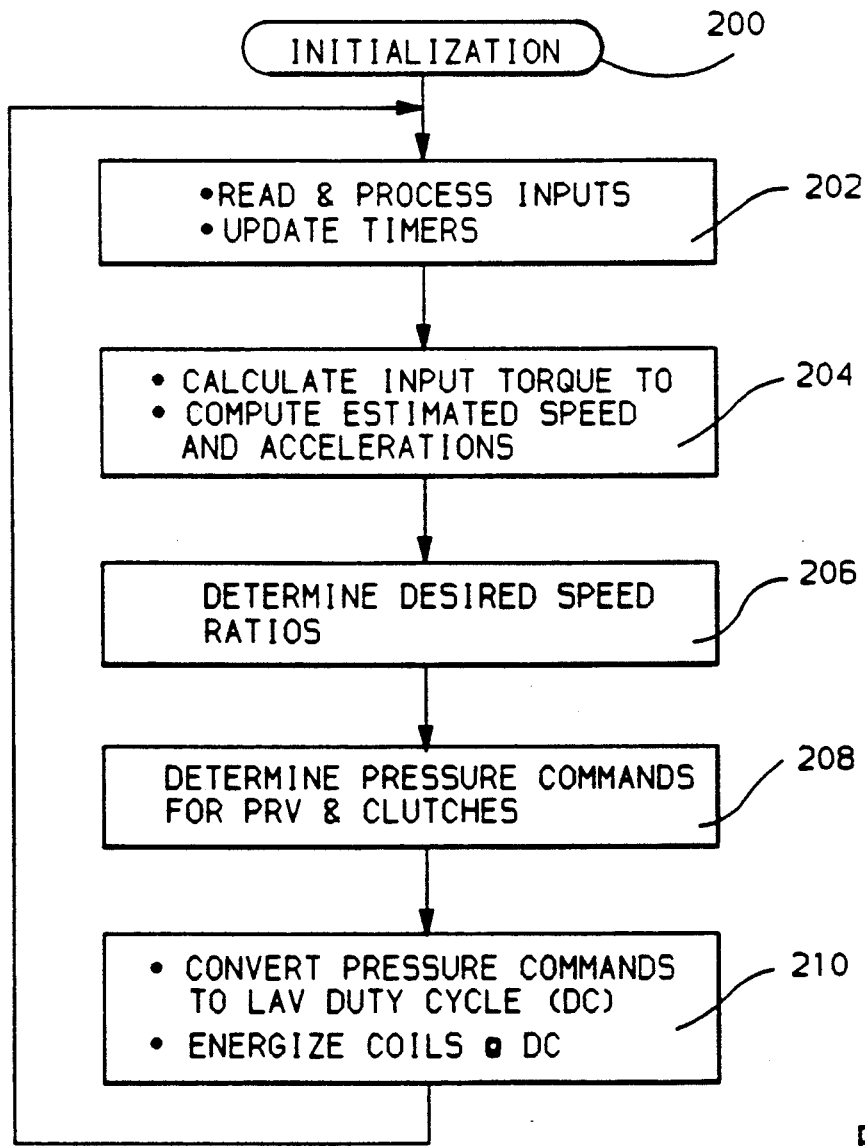
FIG. 6 graphically depicts a table of error gradients based on the error functions depicted in FIGS. 4 and 5.

To this end, the gradients (slopes) of the error functions, represented in FIGS. 4 and 5, are empirically determined and stored in an electronic look-up table as represented by the table shown in FIG. 6. In that table, values of the change in errors e1 and e2 with respect to variation of both adaptive parameters Tfill and Poncrs are given for six different error values. This enables an electronic look-up of the respective gradient values as a function of the measured error values e1 and e2.

According to the multi-variable gradient methodology, the correction, delTfill, for the adaptive variable Tfill is given by the expression:

$$\text{delTfill} = -G1[d(e1)/d(Tfill)*e1 + d(e2)/d(Tfill)*e2]$$

where G1 is a gain term, and $d(e1)/d(Tfill)$ and $d(e2)/d(Tfill)$ are the table gradient values determined from the traces of FIG. 4.

Similarly, the correction, delPoncrs, for the adaptive variable Poncrs is given by the expression:

$$\text{delPoncrs} = -G2[d(e1)/d(Poncrs)*e1 + d(e2)/d(Poncrs)*e2]$$

where G2 is a gain term, and $d(e1)/d(Poncrs)$ and $d(e2)/d(Poncrs)$ are the table gradient values determined from the traces of FIG. 5.

The error values determined in the course of an upshift are used to compute adaptive correction values delTfill and delPoncrs following completion of the shift, and the adaptive parameters are then updated based on the correction values. An example of a suitable methodology for updating the adaptive parameters is given in U.S. patent to Downs et al. U.S. Pat. No. 4,653,350, issued Mar. 31, 1987, and assigned to the assignee of the present invention. According to the technique set forth in that patent, the adaptive parameter is stored as a two-point function of input torque, and the correction value for that parameter is apportioned among the low torque and high torque parameter values in relation to the input torque at which the shift was performed.

The flow charts of FIGS. 7-14 represent a single computer program executed by the microcomputer of control unit 120 for carrying out the control of this invention. The main or executive loop is depicted in FIG. 7 and comprises the instruction blocks 202-210, which are repeatedly and sequentially executed during the operation of the vehicle, as indicated by the flow diagram lines. The block 200 designates a set of program instructions executed at the initiation of each period of vehicle operation for initializing the various registers, timers, etc., used in carrying out the control functions of this invention.

The block 202 reads and processes the various input signals applied to the control unit 120 and increments a control unit timer. The block 204 calculates various terms used in the control of this invention, such as transmission input torque Tin (if not otherwise available), and determines filtered input and output speed and acceleration values. As indicated above, the speed and acceleration values are determined from the measured turbine (Nt) and output (No) speed data, using a Kalman filtering technique. For both turbine and output shafts, the Kalman equations for speed W, acceleration A, and jerk J are as follows:

$$W = W(\text{last}) + T*A(\text{last}) + H1*EE,$$

$$A = A(\text{last}) + T*J(\text{last}) + H2*EE, \text{ and}$$

$$J = J(\text{last}) + H3*EE$$

where the parenthetical "last" indicates a previously computed value, the terms H1, H2 and H3 are filter gain values, T is the sampling interval of the speed measurement N, and the term EE is an estimation error given by the expression:

$$EE = N - W(\text{last}) - T*A(\text{last})$$

Block 206 determines the desired speed ratio based on inputs including throttle position, vehicle speed, and manual valve position. Block 208 determines clutch and band pressure commands for effecting a shift, if required. The pressure commands for pressure regulating valve PRV and nonshifting clutching devices are also determined. Block 210 converts the pressure commands to PWM duty cycle values for producing the required coil current in LAVs 48, 72–78 and 94.

The flow diagrams of FIGS. 8–14 detail the clutch and PRV pressure determination referenced by block 208 of FIG. 7. Referring to FIG. 8, the decision block 212 determines if a shift is in progress. If a shift is in progress, the block 214 is executed to develop the shift control pressures, as detailed in the flow diagram of FIG. 9, and to collect the data required for adaptation If a shift is not in progress, the block 216 is executed to perform nonshifting tasks such as the computation of the adaptive correction values and the allocation of such values to the stored adaptive parameters Tfill and Poncrs. These tasks are detailed in the flow diagrams of FIGS. 10–14.

Figure 9:
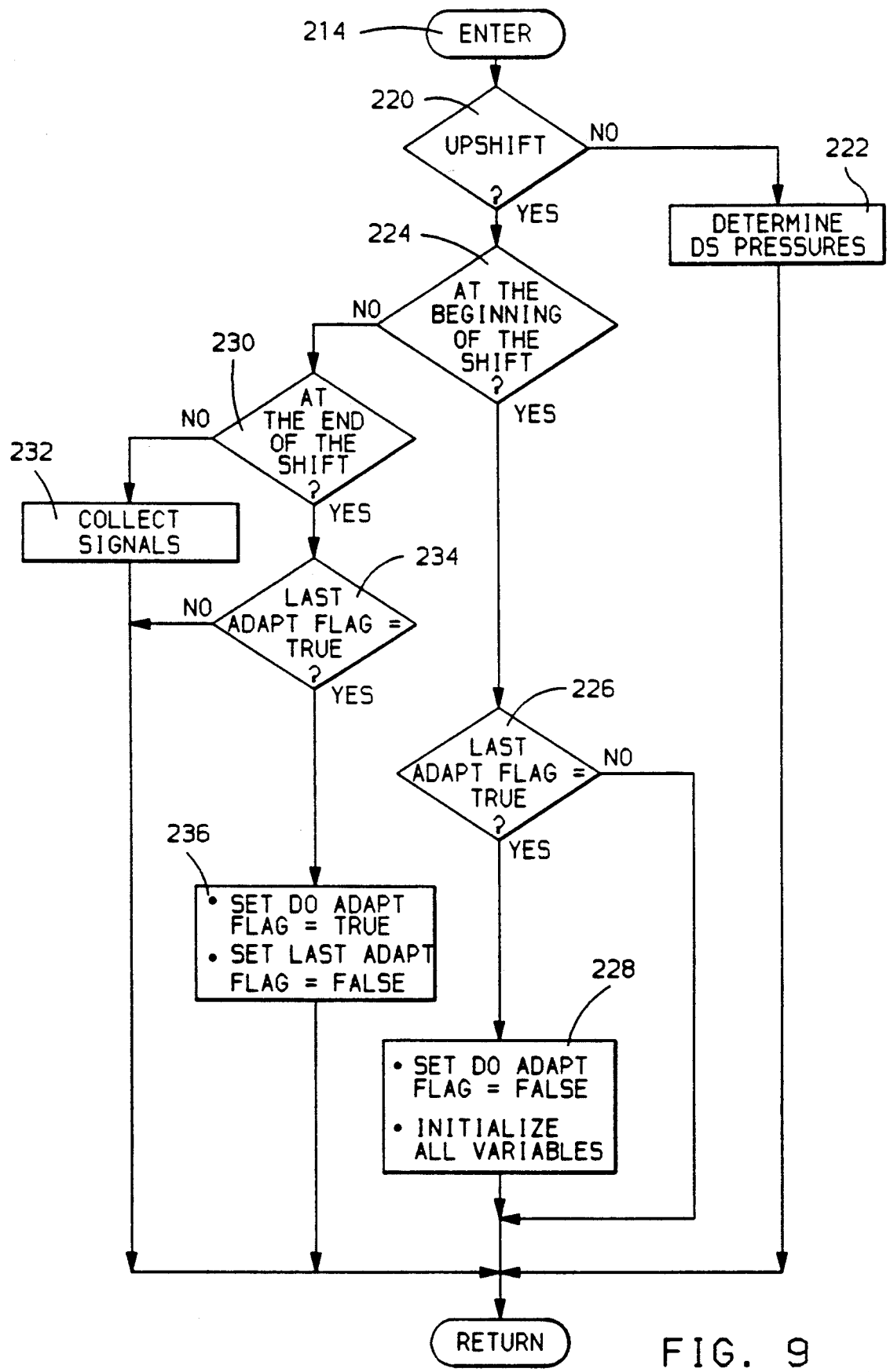

Referring to the shifting mode flow diagram of FIG. 9, the block 222 is executed if a downshift has been commanded, as initially determined at block 220. Such control functions are not central to the present invention, and are not presented in detail. If the commanded shift is an upshift, the blocks 226 and 228 are initially executed to initialize various flags and variables. The LAST ADAPT FLAG is TRUE when the adaptive calculations for the previous upshift have been completed. If the flag is TRUE, as determined at block 226, the block 228 is executed to set the DO ADAPT FLAG to FALSE and to initialize the variables used to determine the error intervals e1 and e2. The FALSE state of the DO ADAPT FLAG signifies that it is not yet time to start the adaptive computations.

Once the flags and variables have been initialized, as determined at block 224, the block 232 is periodically executed to collect the timing data required to determine the error values e1 and e2. Once the shift is completed, as determined at block 230, and the LAST ADAPT FLAG is TRUE, as determined at block 234, the block 236 is executed to set the DO ADAPT FLAG to TRUE, and to set the LAST ADAPT FLAG to FALSE. As indicated above, the TRUE state of the DO ADAPT FLAG signifies that it is time to initiate the adaptive computations, and the FALSE state of the LAST ADAPT FLAG signifies that the adaptive computations for the last shift have not yet been completed.

Figure 10:
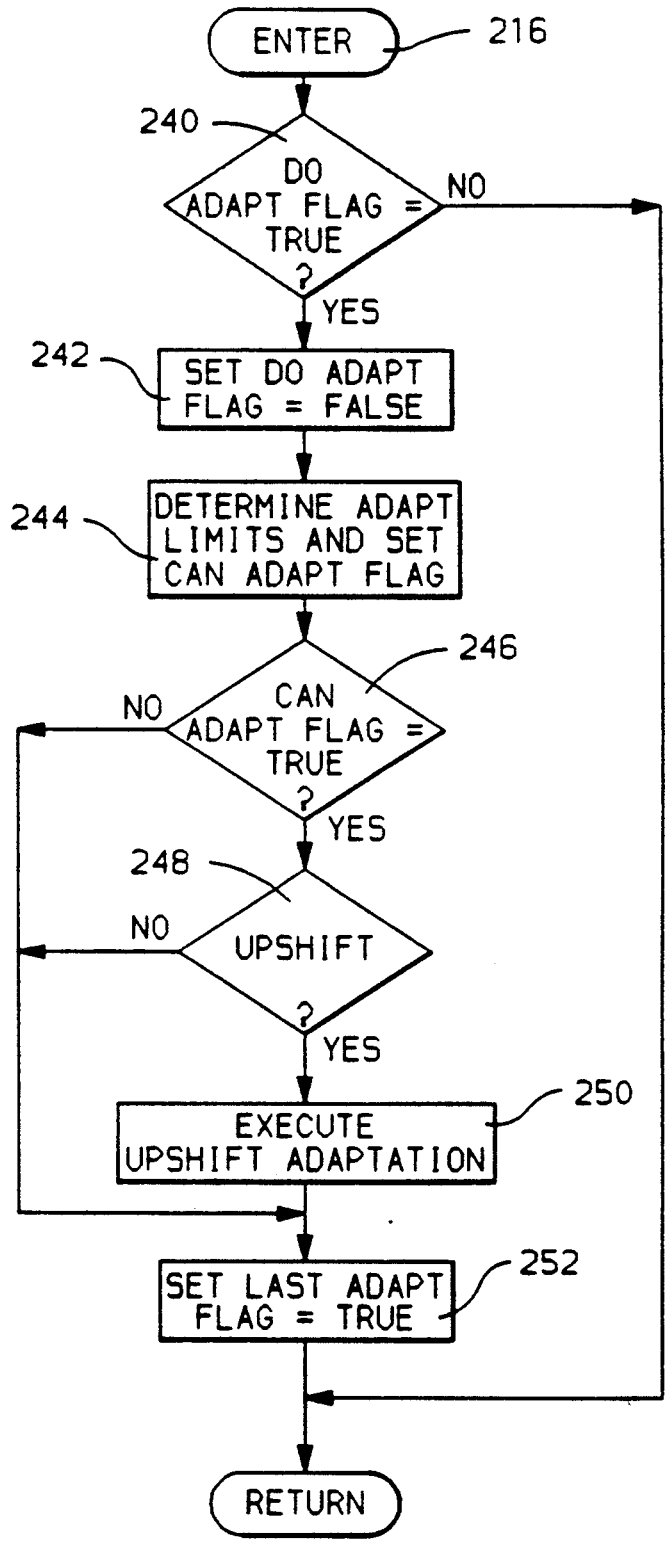

The flow diagram of FIG. 10 is a high level representation of the adaptation routines according to this invention. The flow diagrams of FIGS. 11–14 detail various blocks depicted in FIG. 10, as noted below.

The computational blocks of FIG. 10 are only initiated under certain conditions. First, the DO ADAPT FLAG must be TRUE, as determined at block 240. If block 240 is answered in the affirmative, the blocks 242 and 244 are executed to set the DO ADAPT FLAG to FALSE, and to determine the state of the CAN ADAPT FLAG. The CAN ADAPT FLAG, as described below in reference to the flow diagram of FIG. 11, is TRUE when the powertrain conditions are suitable for the computation of adaptive correction.

If the CAN ADAPT FLAG is not TRUE, or the previous shift was not an upshift, as determined at blocks 246 or 248, the adaptive computations are skipped, and the block 252 is executed to set the LAST ADAPT FLAG to TRUE. If the CAN ADAPT FLAG is TRUE, and the previous shift was an upshift, the block 250 is executed to compute correction amounts delTfill and delPoncrs for the adaptive parameters Tfill and Poncrs. Thereafter, the block 252 is executed to set the LAST ADAPT FLAG to TRUE, signifying completion of the adaptive computations.

Figure 11:
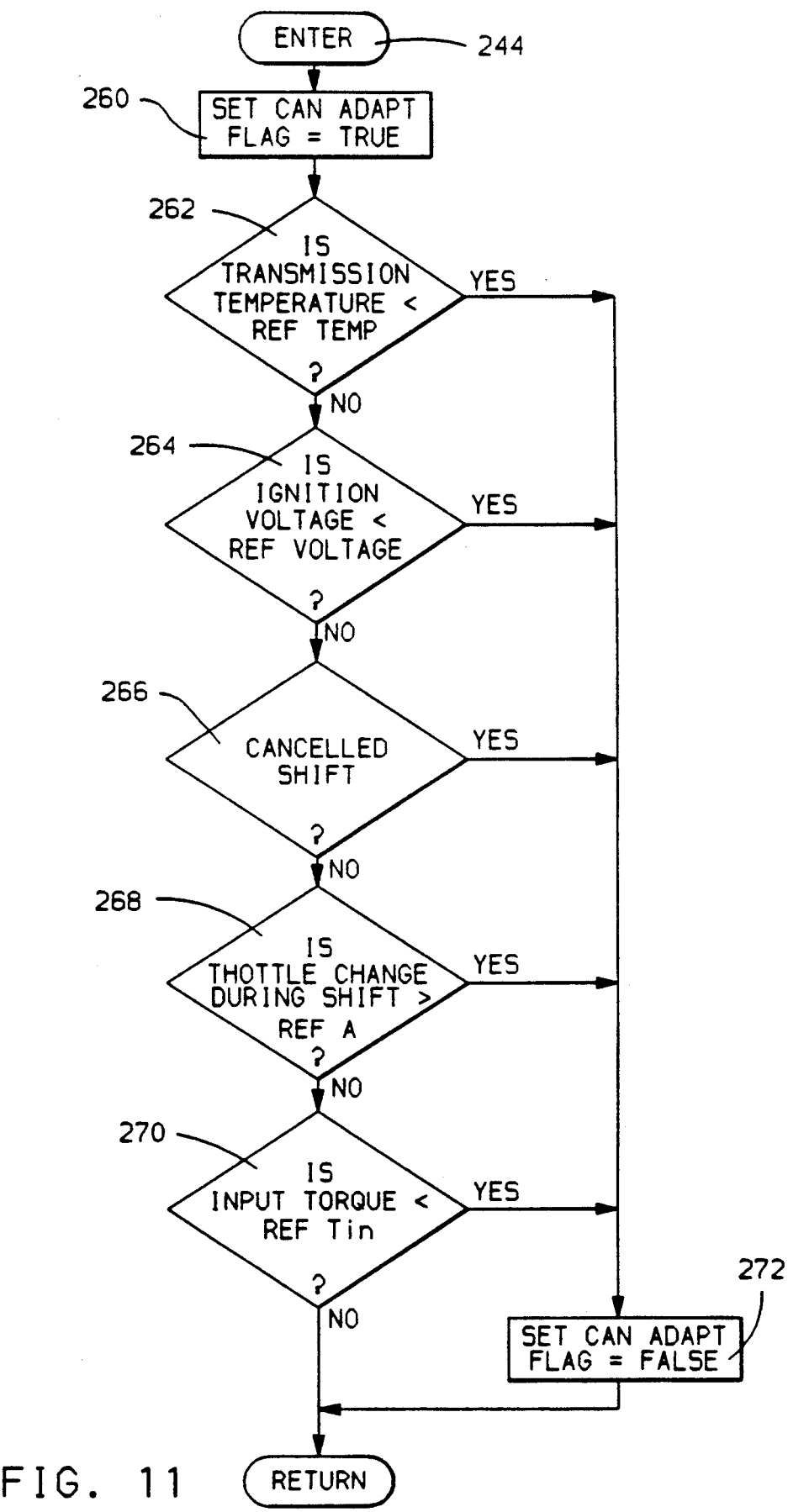

As indicated above, the flow diagram of FIG. 11 details the determination of the state of the CAN ADAPT FLAG. Initially, the block 260 is executed to set the CAN ADAPT FLAG to TRUE. However, if any of the conditions identified at blocks 262–270 are true, the block 272 is executed to set the CAN ADAPT FLAG to FALSE, signifying that the powertrain conditions are not suitable for adaptation. The conditions defined by blocks 262–270 include (1) transmission oil temperature less than RefTemp, a low temperature threshold, (2) ignition voltage less than RefVoltage, a low threshold voltage, (3) canceled shift, (4) engine throttle change during the shift greater than a threshold RefA, and (5) input torque less than RefTin, a low threshold torque present during coast conditions.

Figure 12A:
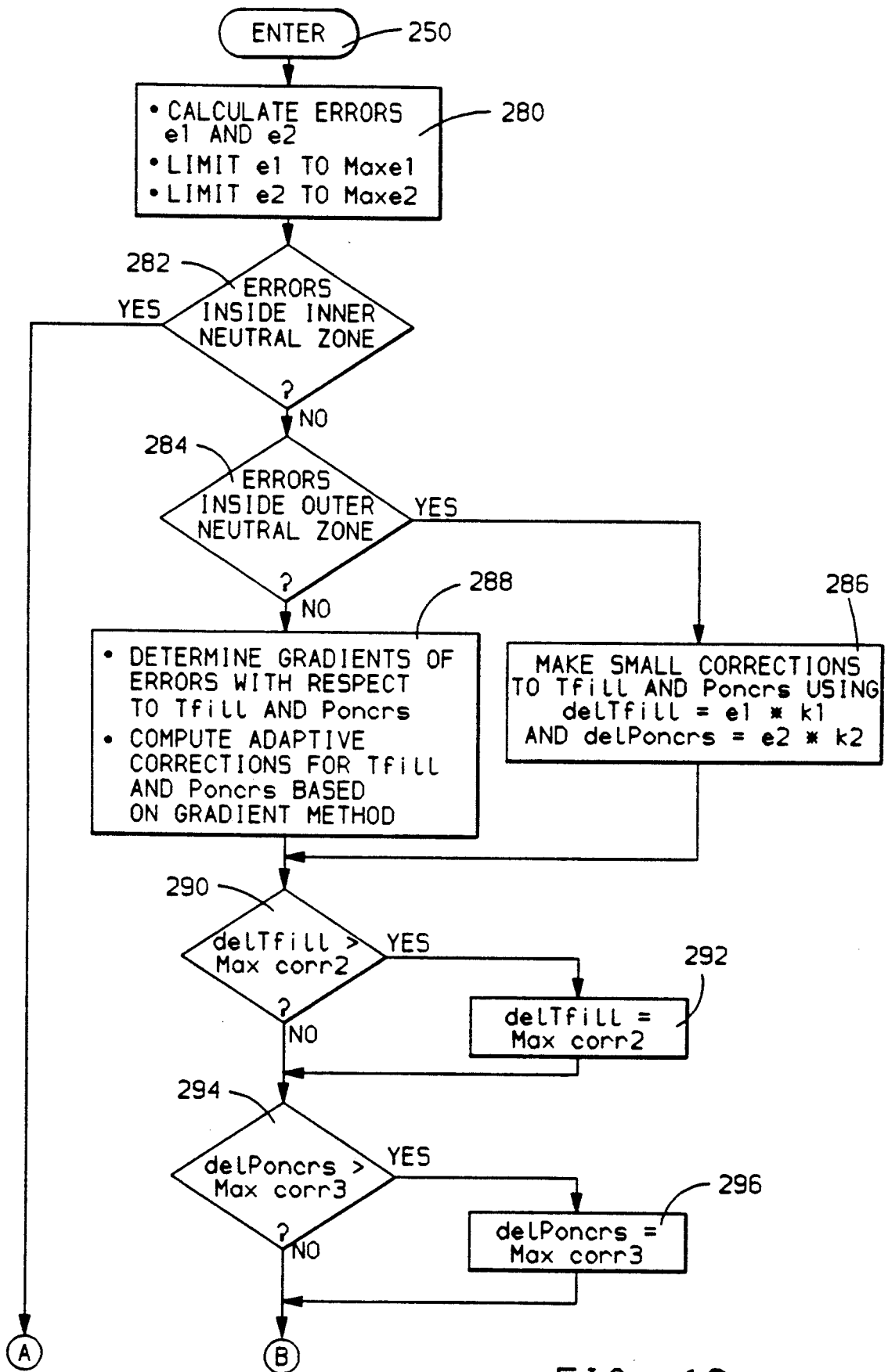
Figure 12B:
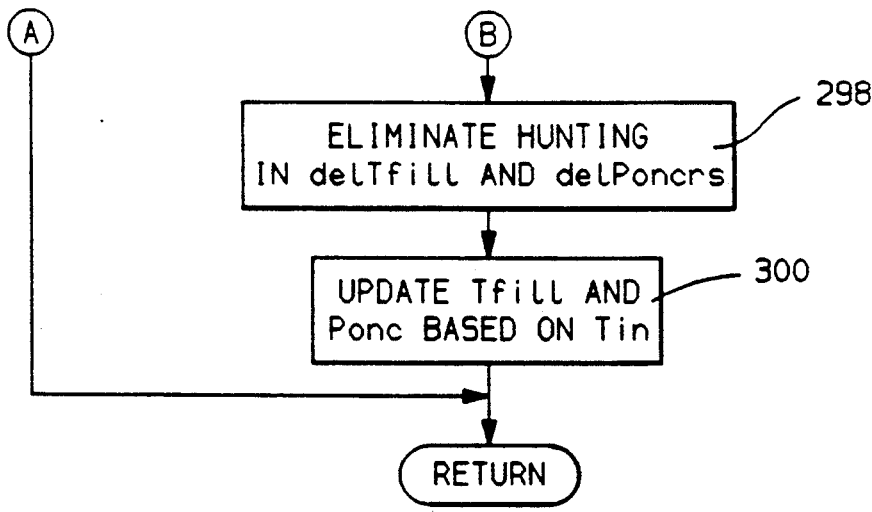

The flow diagram of FIGS. 12a–12b details the adaptation computation referenced at block 250 of FIG. 10. Initially, the block 280 is executed to calculate the timing errors e1 and e2 based on timing data collected during the previous upshift. As indicated, the error value e1 is limited to a maximum value Maxe1, and the error value e2 is limited to a maximum value Maxe2. If both errors e1 and e2 are within an inner neutral zone, such as ±20 ms, as determined at block 282, no adaptation is required. If at least one of the error values e1, e2 lies outside the inner neutral zone, but within a predefined outer neutral zone, as determined by blocks 282 and 284, the block 286 is executed to make small adaptive corrections in direct proportion to the measured error values. Algebraically, $$\text{delTfill} = e1*K1, \text{ and}$$

$$\text{delPoncrs} = e2*K2,$$

where K1 and K2 are fractional constants. If at least one of the error values e1, e2 lies outside the outer neutral zone (as defined by a threshold of ±40 ms, for example), the block 288 is executed to determine the error gradients and to compute the adaptive corrections delTfill and delPoncrs in accordance therewith. As indicated by the blocks 290-296, the fill time correction delTfill is limited to a maximum correction amount Maxcorr1, and the return spring pressure correction amount delPoncrs is limited to a maximum correction amount Maxcorr2. Once the adaptive correction amounts delTfill and delPoncrs are determined, the blocks 298 and 300 are executed to limit the correction amounts as required to eliminate hunting, and to update the Tfill and Poncrs schedules, as described above in reference to the Downs et al. patent.

Figure 13:
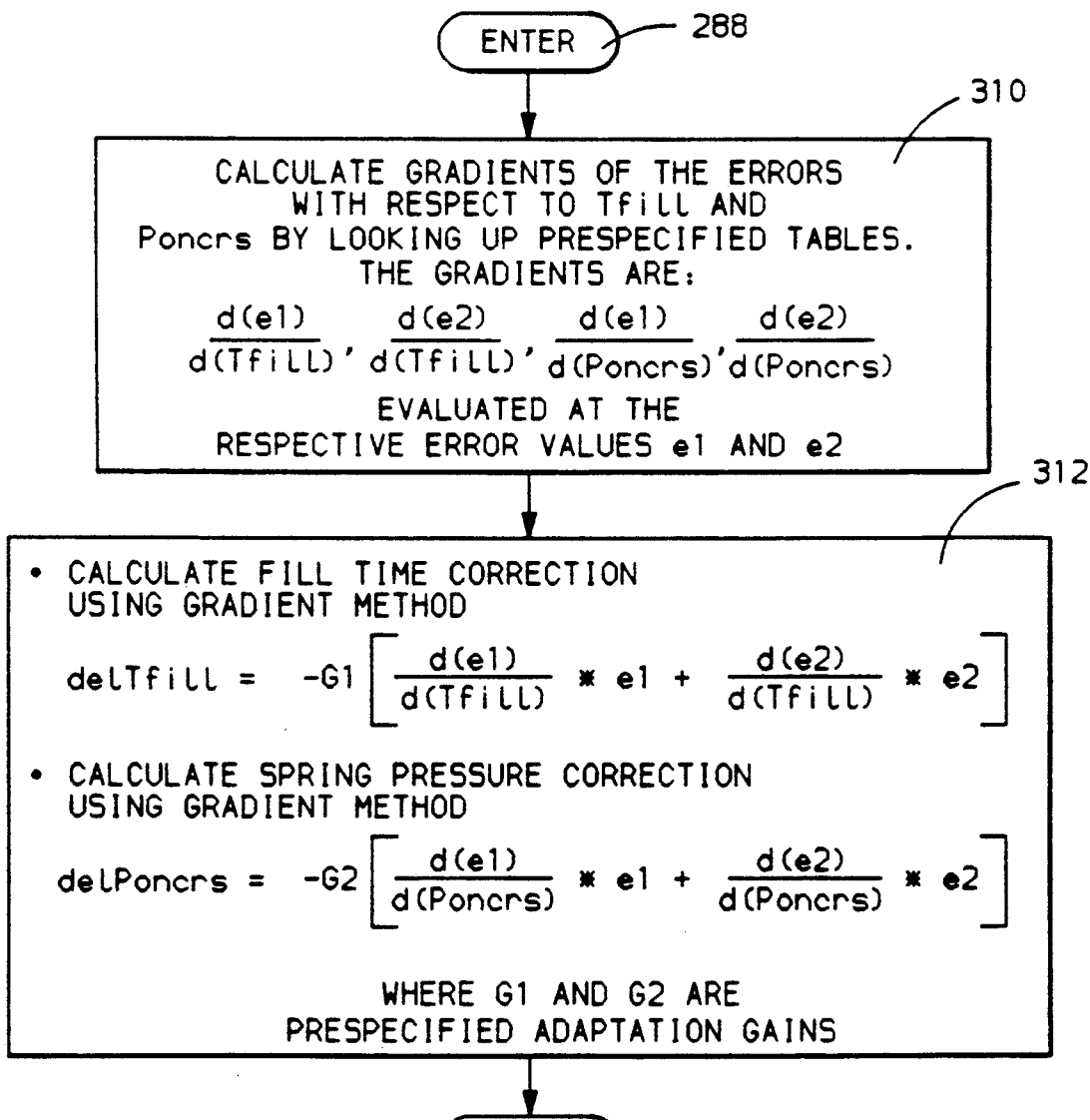

The flow diagram of FIG. 13 details the adaptation computations of delTfill and delPoncrs, referenced by block 288 of FIG. 12a. First, the block 310 is executed to determine the gradients of errors e1 and e2 by table look-up, as described above in reference to the table of FIG. 6. The terms d(e1)/d(Tfill) and d(e1)/d(Poncrs) are determined as a function of the measured value of the error e1, and the terms d(e2)/d(Tfill) and d(e2)/d(Poncrs) are determined as a function of the measured value of the error e2. Then, the block 312 is executed to compute the correction terms delTfill and delPoncrs as a function of the gradient terms, as described above.

Figure 14:
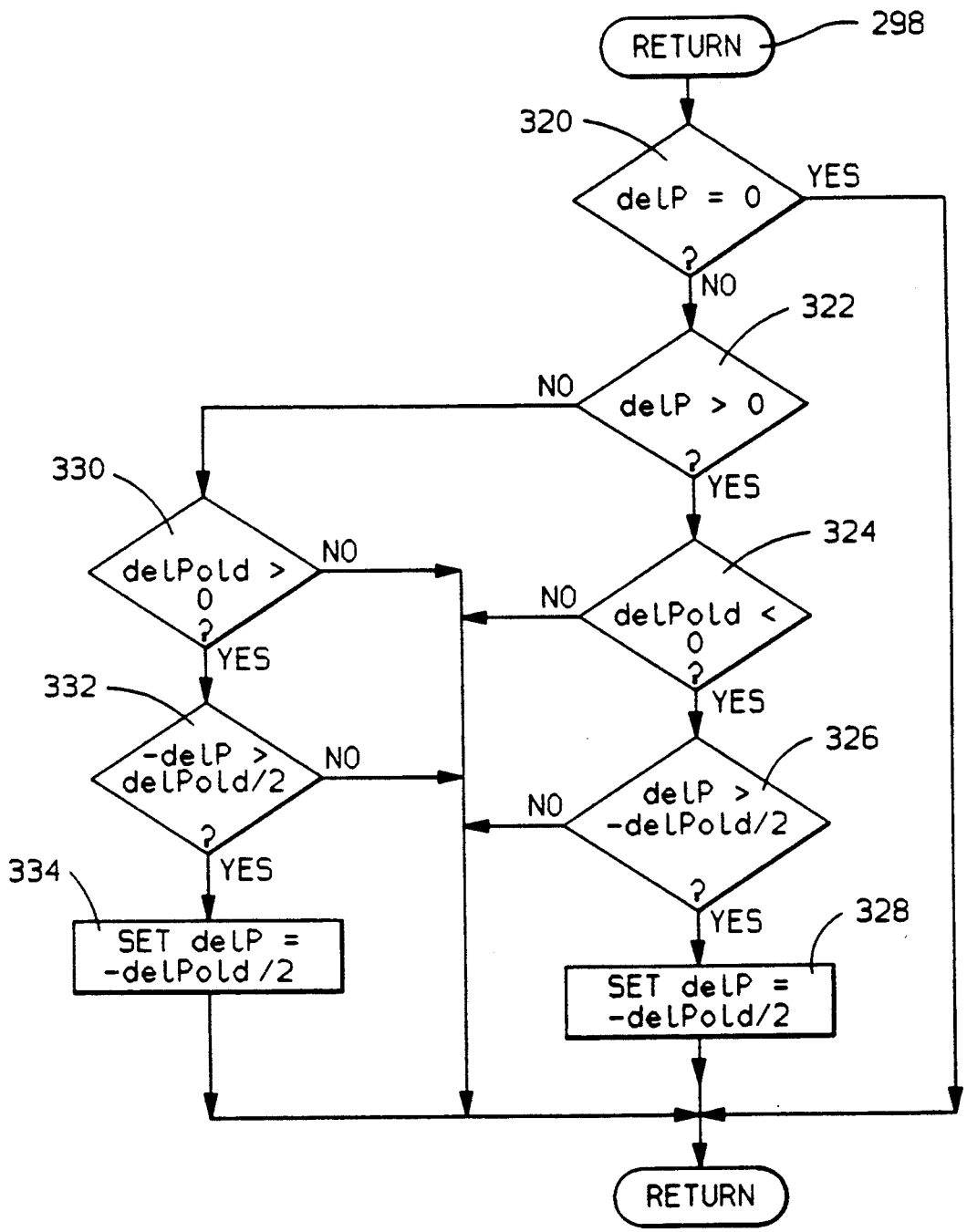

Finally, the flow diagram of FIG. 14 details the hunting elimination routine referenced by block 298 of FIG. 12b, with respect to the pressure correction delPoncrs (abbreviated in FIG. 14 as delP). A similar routine is executed in relation to the fill time correction amount delTfill.

If the current correction amount delP is non-zero and positive, as determined at blocks 320 and 322, the blocks 324 and 326 are executed to compare the correction amount delP to the previous correction amount, delPold. If delPold was negative (block 324), and delP is greater in magnitude than delPold/2 (block 326), block 328 is executed to limit the magnitude of the new correction amount delP to (delPold/2). Similarly, if the current correction amount delP is negative, the blocks 330 and 332 are executed to determine if delPold was positive, and if delP is greater in magnitude than (delPold/2). If so, the block 334 is executed to limit the magnitude of the new correction amount delP to (delPold/2). In this way, the hunting elimination routines operate to limit the magnitude of a given correction amount to one-half of the previous correction amount if the sign of the new correction amount is opposite to the sign of the previous correction amount.

While this invention has been described in reference to the illustrated embodiment, it is expected that various modifications will occur to those skilled in the art, and that controls incorporating such modifications may fall within the scope of this invention, which is defined by the appended claims.

The embodiments of the invention in which an exclusive property or privilege is claimed are defined as follows:

1. In a vehicle drivetrain including a multiple speed ratio automatic shift transmission connected to transmit input torque to a drive axle, where shifting to a specified speed ratio involves a fill phase during which fluid pressure is supplied to an on-coming torque transmitting device associated with said specified speed ratio for an empirically derived fill interval as represented by a first predetermined quantity Tfill to prepare said device for engagement, and a torque phase during which an on-coming fluid pressure is supplied to said on-coming torque transmitting device in accordance with a pressure command to initiate said engagement, a method of operation comprising the steps of:

determining said pressure command as a function of an empirically derived pressure required to initiate engagement of said on-coming device once said device has been filled in preparation for engagement, the empirically derived pressure being represented by a second predetermined quantity Poncrs;

determining first and second torque phase progression intervals T1, T2 in response, respectively to an achievement of first and second specified milestones TRIGGER1, TRIGGER2 as a function of drive axle acceleration from an initial value to a target value;

comparing said first and second intervals T1, T2 with desired intervals T1des, T2des to determine first and second error signals e1, e2;

apportioning each of said first and second error signals e1, e2 among the first and second predetermined quantities Tfill, Poncrs as a function of the variation of said error signals per unit change of each of said predetermined quantities to form first and second correction signals delTfill, delPoncrs for said first and second predetermined quantities Tfill, Poncrs; and applying said first and second correction signals delTfill, delPoncrs to said first and second predetermined quantities Tfill, Poncrs, thereby to improve the shift quality in a subsequent shift to said specified speed ratio.

2. The method of operation set forth in claim 1, wherein said variation of said error signals per unit change of each of said predetermined quantities is retrieved from a table of previously stored gradient values as a function of the determined error signals e1, e2.

3. The method of operation set forth in claim 1, wherein the first and second intervals "T1" and "T2" are determined in relation to the end of said fill phase.

4. The method of operation set forth in claim 1, wherein the first and second specified milestones are achieved when a change in drive axle acceleration exceeds first and second specified percentages of the difference between said initial and target values.

5. The method of operation set forth in claim 1, wherein the second specified milestone is achieved upon completion of said torque phase.

6. The method of operation set forth in claim 1, wherein the first correction signal delTfill for said first predetermined quantity Tfill is determined in accord with $$\text{grad } e1/Tfill \cdot e1 + \text{grad } e2/Tfill \cdot e2$$

where grad e1/Tfill is a known rate of change of said first error signal e1 with respect to said first predetermined quantity Tfill, and grad e2/Tfill is a known rate of change of said second error signal e2 with respect to said first predetermined quantity Tfill.

7. The method of operation set forth in claim 1, wherein the second correction signal delPoncrs for said second predetermined quantity Poncrs is determined in accord with $$\text{grad } e1/Poncrs \cdot e1 + \text{grad } e2/Poncrs \cdot e2$$

where grad e1/Poncrs is a known rate of change of said first error signal e1 with respect to said second predetermined quantity Poncrs, and grad e2/Poncrs is a known rate of change of said second error signal e2 with respect to said second predetermined quantity Poncrs.

8. The method of operation set forth in claim 1, wherein said correction signals delTfill and delPoncrs are individually limited in relation to previously determined correction signals when a current correction signal is opposite in sign to a respective previously determined correction signal.

* * * * *